US012680924B2

(12) United States Patent
Saunders

(10) Patent No.: US 12,680,924 B2
(45) Date of Patent: Jul. 14, 2026

(54) DEVICE USED FOR REAL TIME FIELD SAMPLING FOR DNA EXTRACTION

(71) Applicant: Robert G Saunders, Parksville (CA)

(72) Inventor: Robert G Saunders, Parksville (CA)

( * ) Notice: Subject to any disclaimer, the term of this patent is extended or adjusted under 35 U.S.C. 154(b) by 0 days.

(21) Appl. No.: 18/313,335

(22) Filed: May 6, 2023

(65) Prior Publication Data

US 2023/0358651 A1      Nov. 9, 2023

Related U.S. Application Data

(60) Provisional application No. 63/339,683, filed on May 9, 2022.

(51) Int. Cl.
G01N 1/40 (2006.01)
(52) U.S. Cl.
CPC ... G01N 1/4005 (2013.01); *G01N 2001/4016* (2013.01)
(58) Field of Classification Search
CPC ..................... G01N 1/4005; G01N 2001/4016
USPC ....................................................... 73/863.23
See application file for complete search history.

(56) References Cited

U.S. PATENT DOCUMENTS 6,306,350 B1 * 10/2001 Mereish .................. G01N 33/18
73/863.25
2003/0186428 A1 * 10/2003 Guillot ................... C12M 29/16
435/297.3

2006/0188942 A1 * 8/2006 Keenan ..................... C12Q 1/04
435/7.1
2009/0101575 A1 * 4/2009 Alburty .................... C12Q 1/24
210/717
2009/0217777 A1 * 9/2009 Hanson .................. B01D 61/18
210/651
2011/0177551 A1 * 7/2011 Mimitsuka ................ C12P 7/02
435/297.1
2016/0106353 A1 * 4/2016 Schuetz ............. A61B 5/15003
210/416.1
2020/0086279 A1 * 3/2020 Sohail ...................... C02F 1/444
2021/0190809 A1 * 6/2021 Vlassov ................. G01N 1/405
2022/0072547 A1 * 3/2022 Creelman ......... B01L 3/502761
2022/0331793 A1 * 10/2022 Iwata .................. B01L 3/50255

FOREIGN PATENT DOCUMENTS

CN            215404207 U  *  1/2022
GB              2580099 A  *  7/2020 ............. B01D 61/14

* cited by examiner

*Primary Examiner* — Marrit Eyassu

(74) *Attorney, Agent, or Firm* — Ariel S. Bentolila; Bay Area IP Group

(57)               ABSTRACT

A sampling device including an intake pump coupled with a volume controller to provide a known volume of samples such as liquid collected through a specialized hollow membrane filter. Once the known volume of sample is filtered the intake pump is turned off, an air pump turns on and removes residual or excess sample. The membrane filter is then preserved for extraction of DNA/RNA.

20 Claims, 5 Drawing Sheets

100

100

110

130

260

150

160

120

190

170

180

145

170

140

300

310

140

145

180

180

190

140

DEVICE USED FOR REAL TIME FIELD SAMPLING FOR DNA EXTRACTION

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

BACKGROUND OF THE RELEVANT PRIOR ART

One or more embodiments of the invention generally relate to extracting Deoxyribonucleic Acid (DNA) present in water bodies. More particularly, certain embodiments of the invention relate to a device performing real time field sampling for DNA extraction.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Water bodies have hundreds of species of marine creatures moving and interacting with each other. These creatures leave tiny traces of DNA in their environment called environmental DNA (eDNA). Sampling and analyzing the eDNA in the water bodies helps in understanding the number and location of the marine creatures. eDNA sampling also helps in detecting aquatic microorganisms such as bacteria, viruses, fungi, and small parasites.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that the current methods used for analyzing eDNA involve collection and transportation of water or using a portable filter. In the first method water is collected from various depths using Niskin bottles (oceanographic samplers) and transported to the laboratory for filtering. Alternatively, volumes of water are collected in containers and transported to laboratory facilities or docks for filtering. However, the collection and transportation of water limits the number of samples collected and increases the chances of contamination. In the second method, portable filters are used on site. However, the currently available portable filters clog rapidly and have limitations with respect to the time and volume processed. For example, filtering just 2 liters of water might take around 45 mins.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
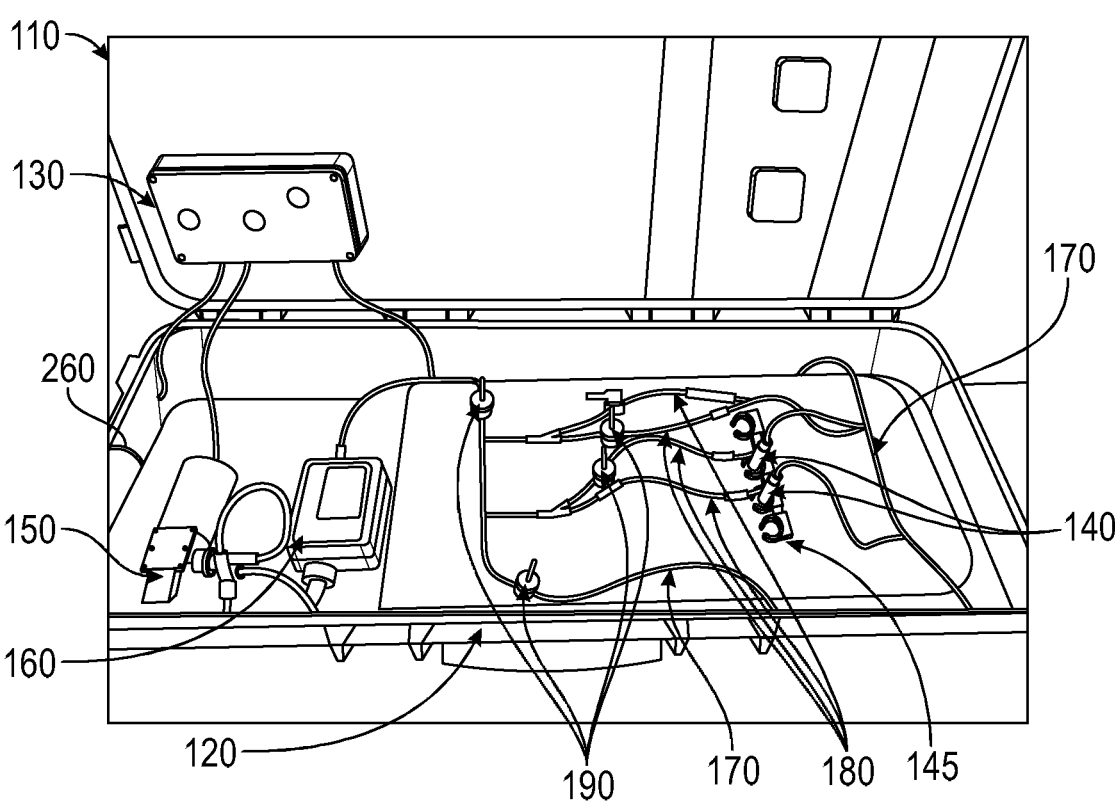
FIG. 1 is an illustration of an exemplary real time environmental DNA sampling device, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to, nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term [substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar to or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation.

Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C . . . sctn. 112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s). Furthermore, any statement(s), identification(s), or reference(s) to a structure(s) and/or element(s) that corresponds to and/or supports a claim limitation(s) phrased in functional limitation terms covered by 35 USC § 112(6) (post AIA 112(f)) should be understood to be identified by way of example and not limitation, and as such, should not be interpreted to mean that such recited structure and/or element is/are the only structure(s) and/or element(s) disclosed in this patent application that corresponds to and/or supports such claim limitations phrased in functional limitation terms. This claims interpretation intention also applies to any such subsequent statements made by Applicant during prosecution.

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other. It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the As will be described in some detail below with reference to the accompanying figures, many embodiments of the present invention may provide a real time environmental Deoxyribonucleic Acid (eDNA) sampling device or instrument. The eDNA sampling device or EZ-E-DNA enables researchers to collect large volumes of water in real time. The sampling device collects cellular debris which contain DNA/RNA. The collected cellular debris may then be extracted for DNA/RNA. The device includes a sampling kit having a pump and a programmable controller and a hollow membrane filter. The sampling kit combined with the hollow membrane filters enable researchers, government agencies, industries, and even citizen scientists in coastal communities to rapidly and inexpensively conduct non-invasive biomonitoring surveys, with the capacity to collect dozens of filtered water samples in a day from a small boat, thereby, increasing the capacity to monitor large bodies of water, and multiple depths, for the identification of animals, plants, bacteria, and viruses. The eDNA sampling device is currently used by Canadian, Norwegian, Russian, and American researchers and government agencies as well as first nations. The device allows non-governmental agencies to inexpensively sample the marine environment and provide a baseline for future comparisons of ecosystems. Further, the device is also being used in aquaculture farms and hatcheries as a non-invasive means to assess shifts in salmon pathogens in the water column.

The device is operated from small vessels or large ships and the pump is attached to a suction line at a predetermined depth. The suction pump pumps water from marine bodies such as, without limitation, ocean, sea, river, etc., and the programmable controller controls a preprogrammed volume of water to be sent to the hollow membrane filter for the filtering process. The device can also be operated to collect cellular debris samples from freshwater streams, sewage, air, or any medium in which DNA/RNA analysis is required.

The hollow membrane filter is used for filtering large volumes of water. The hollow membrane filter includes an untouched cartridge design for minimizing contamination while operating on-site. The debris collected on the filter is extracted for DNA and RNA.

The sampling device/instrument or collection system in the plastic case combined with the hollow membrane filter allow for real time field sampling of samples such as, but not limited to liquid, water or air without the collection and transporting of the sample. Sampling may take place at the field locations without the need to transport the samples back to the laboratory. This reduces the chance of sample contamination and allows for many more sample collections per day. The sampling instrument complements the hollow membrane filter. Samples may now be collected and filtered within a few minutes onboard a marine vehicle or ship.

The sampling instrument may include a programmable controller which accurately measures the volume filtered and automatically shuts off the flow of the sample once a desired sample volume is reached. This reduces the time to collect samples and allows for accurate replicate sampling of similar volumes of samples. The exact volume of samples filtered between sites are required for accurate comparisons of DNA/RNA between sampling sites.

The collection system includes an air pump such as but not limited to a small air compressor which after the sample is collected, the excess sample is blown out and the hollow membrane filter is injected with a DNA/RNA preservative buffer such as, but not limited to, RNA-Later and capped. Alternate DNA/RNA preservatives are available that are shelf stable for longer periods of time that, once added to the hollow membrane, may enable the filters to be shelf stable. The DNA/RNA collected on the hollow membrane filter is also shelf stable and may be stored for long periods of time and shipped over long distances. The stability of the hollow membrane filter may allow for extended sampling over many days or months without the need for immediate extraction of the DNA/RNA. Those skilled in the art would be aware of the differing properties of the various available preservative buffers and would generally use the appropriate buffer depending on what is required for specific use.

FIG. 1 is an illustration of an exemplary real time environmental DNA (eDNA) sampling device, in accordance with an embodiment of the present invention. In FIG. 1 different components in the eDNA sampling device 100 are shown. Device 100 includes a first section comprising a sampling kit and a second section comprising a hollow membrane filter 140 placed on filter holder 145, all enclosed in a case. The case includes an upper enclosure or lid 110 and a lower base or support 120. The case may be made of a waterproof, hard plastic material, such as, without limitation, Acrylonitrile Butadiene Styrene (ABS), Polycarbonate, or ultra-high molecular weight polyethylene UHMW. In the present embodiment, device 100 includes, for example, without limitation, a semi-waterproof case with dimensions 1 meter×60 cms×30 cms (length×width×height) and weighing approximately 20 pounds. Device 100 includes a power supply 130, such as, without limitation, a direct current (DC) power supply or a battery. In the present embodiment, for example, without limitation, a 12 Volts DC power supply is used for the operation of device 100.

The sampling kit of device 100 includes an intake or input pump 150 and a programmable volume controller 160. In some embodiments, the sampling kit may include, for example, without limitations, four pumps for its operation. Pump 150 is capable of pumping high volume of water from marine bodies. Pump 150 includes such as, without limitation, a peristaltic pump, a diaphragm pump, or an air pump. Programmable volume controller 160 controls the flow of water to hollow membrane filter 140. Volume controller 160 accurately counts a preprogrammed volume of liquid such as, without limitation, the amount of water that needs to be allowed to flow through one or more membrane filters 140 and the volume controller turns off the flow and intake pump 150 turns off once the preprogrammed level is reached. In some embodiments, volume controller 160 may include a microprocessor-controlled system for enabling automated sampling and collection of cellular debris, which may contain DNA/RNA, at preprogrammed intervals including the automatic removal of liquid and the injection of a DNA/RNA stabilizing buffer, such as RNA-Later.

Membrane filters 140 for collecting samples are placed on respective filter holders 145 and attached with luer locks fittings to the sampling system. Luer locks help in preventing contamination of the collected sample. Membrane filters 140 are designed to be compatible with different types of Luer locks, including one-way luer locks. In the present embodiment, for example, without limitation, each membrane filter may include 120 hollow membrane fibers having a pore size approximately ranging from 0.1 to 0.45 microns.

In some embodiments, hollow membrane filter 140 is larger than the surface area of a 2-inch flat filter such as a Sterivex filter. The larger the surface area the greater the ability to filter larger volumes of samples. There are 120 Polyethersulfone (PES) membrane tubes in each membrane filter 140 with a surface area of approximately fifty (50) square mm per tube by 120 tubes, equivalent to a surface area of about 6000 square mm. As compared to the surface area of a 2-inch flat filter of 2000 square mm. In addition, the hollow membrane filter is enclosed inside a cylinder (as opposed to a flat filter) and does not require handling (a source of contamination). Hollow membrane filter 140 will filter at about five (5) liters of clean water in 2.5 minutes, that makes the membrane filter 140 desirable for environment DNA/RNA sampling. The larger the volume filtered the better the ability to detect small quantities of DNA/RNA. The extraction of DNA/RNA may be expensive and large volumes of material may require large amounts of expensive reagents. The size of hollow membrane filter 140 increases the volume sampled and at the same time minimizes the cost of extraction reagents.

Membrane filters 140 may withstand pressure up to 60 PSI (Pound-force per square inch). In general, hollow membrane filters provide approximately 3 times the surface area of conventional flat surface filters, thereby, improving the sampling rate i.e., sampling large amount of water in lesser time, as compared to devices using standard flat filters. Lesser sampling time provides more sampled areas which enables the collection of more comprehensive data. For example, without limitation, in the present embodiment device 100 samples 5 liters of water in less than 5 minutes. Further, in order to achieve economical DNA extraction, membrane filter 140 may be designed to hold a minimal amount of liquid. For example, without limitation, in the present embodiment, hollow membrane filter 140 holds 2.8 milli liters (ml) of sampled liquid. In some embodiments, volume controller 160 may include a solenoid valve built inside which once five (5) liters of sample is pumped, flow is shut off. Once the flow stops, a pressure switch, such as a peristaltic pump, turns off intake pump 150. The controller would need an electrical connection to turn off the intake pump if the intake pump does not have a pressure switch.

Figure 2:
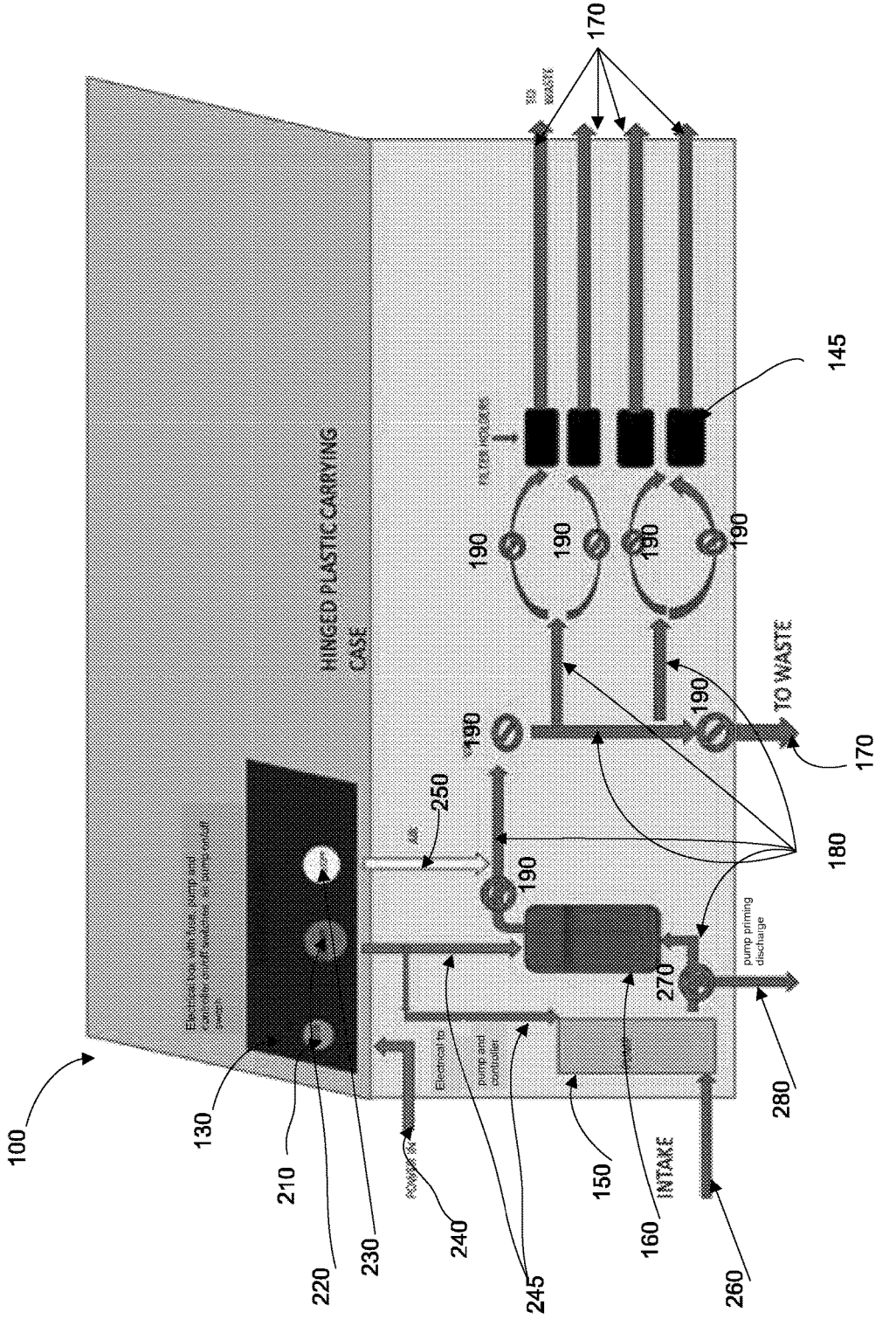
FIG. 2 is a schematic illustration of an exemplary real time environmental DNA sampling device, in accordance with an embodiment of the present invention.

Further, device 100 includes small water tubes or pipes 180 enabling water flow between different parts of device 100. Water/Liquid tubes or pipes 180 are made of flexible material, such as, without limitation, polyurethane (PU), polyethylene (PE) or silicone. Push connect polyethylene valves 190 control the flow of water to various parts of device 100. Device 100 includes line 170 for letting wastewater out of device 100. Referring to FIG. 2, device 100 includes priming valve 270 and priming line 280 for priming intake pump 150 prior to the start of sampling.

FIG. 2 is a schematic illustration of an exemplary real time environmental DNA sampling device, in accordance with an embodiment of the present invention. In FIG. 2 different components of eDNA device 100 and their interconnection is shown. Device 100 includes a first section comprising a sampling kit for sampling the medium for which eDNA analysis needs to be performed and a second section comprising a hollow membrane filter 140 placed on filter holder 145, wherein the membrane filter 140 is designed to collect debris or sample for the analysis. The sampling kit and the membrane filter 140 are all enclosed in a case. Device 100 is operated from large ships or small vessels, for example, without limitations a boat or at the side of a water body such as a stream or water tank. Device 100 includes a power supply unit 130. Power supply unit 130 includes a fuse 210, an on/off controller switch 220 for controlling the operation of the sampling kit comprising an intake pump 150 and a programmable volume controller 160, and an on/off air pump switch 230 for controlling the operation of an air pump 250. Device 100 is powered by an external power source 240. For example, without limitation, external power source 240 is a 12 Volts DC power supply. In some embodiments, power source 240 may include a battery source, such as, without limitation, an alkaline battery, a lead acid battery, lithium-ion battery, lithium iron phosphate, rechargeable battery, solar battery, etc., for powering the operation of device 100. During operation, intake pump 150 is engaged with a suction line 260, nominally a ½ inch flexible hose. Suction line 260 may be immersed at a predetermined depth, to 10 meters (for a ½ suction line) into the medium for which eDNA sampling is being performed. The medium includes, such as, without limitation, liquid, or air. In the present embodiment, the eDNA sampling is performed on marine water bodies, for example, without limitation, ocean, sea, tanks, or river. In some embodiments, the eDNA sampling may be performed on other liquid medium such as, without limitation, sewage, or freshwater stream. In some other embodiments, the eDNA sampling may be performed on air samples within a building such as, without limitation, an airport and the DNA collected may be used to determine the genetic sequence of individuals, animals, plants, bacteria, viruses, etc.

Upon turning on controller switch 220, intake pump 150 and programmable volume controller 160 are turned on. Pump 150 pumps, suction and/or transports fluid from the medium through suction line 260. Device 100 includes valve 270 and line 280 for priming pump 150 prior to the start of sampling. Priming valve 270 is opened to allow intake pump 150 to prime and to discharge wastewater prior to sampling. Once intake pump 150 is primed priming valve 270 is closed and water flows through the sampling system. For example, without limitation, in the present embodiment, the medium includes marine bodies such as, without limitations, ocean, sea, river, etc. Volume controller 160 may have an accurate count of the volume of the fluid pumped. For example, without limitation, in the present embodiment, a prepro-grammed volume of water is pumped (generally is 5 liters) from a depth for which EDNA sampling is required and allowed to pass through hollow membrane filters 140. In some embodiments, a twin pump/controller combination may be used to pump water from two different sampling stations simultaneously. The twin pump/controller is a dupli-cation of the single pump/controller system and fits within the eDNA device 100. Hollow membrane filter 140 may receive their input from the output of volume controller 160. Once a preprogrammed volume is pumped into membrane filters 140 the water flow is automatically turned off and intake pump 150 turns off. Upon turning off intake pump 150, an air pump 250 is manually turned on to purge out residual water from membrane filters 140. The residual water is purged out through waste lines 170. Once water is purged out, filters 140 are injected with DNA/RNA stabi-lizing buffer such as RNA-LATER to preserve the DNA/RNA and closed with luer lock end caps to avoid any contamination. RNA-LATER (or similar buffer) solution stabilizes the DNA/RNA minimizing the need to use liquid nitrogen freezing of the samples.

In some embodiments, device 100 is operated automati-cally to reduce the need for human intervention. For example, without limitation, in some embodiments the e-DNA sampler is coupled with a programmable micro-processor for automatic fluid collection, air purging, and the injection of DNA/RNA stabilizing buffer, such as RNA-LATER. The sampling can be automatically done aboard ships or drones.

In some other embodiments, device 100 may sample air. The sampling kit and hollow membrane filter 140 may be made compatible to sample air. For example, without limi-tations, in some other embodiments, intake pump 150 includes an air compressor and volume controller 160 includes an air meter controller. Hollow membrane filter 140 picks up debris ranging between 0.1 to 0.45 microns in size. For example, without limitations, viruses and bacteria attached to debris or dust will be collected by filter 140. In an example embodiment, filters 140 may collect, for example, without limitation, airborne debris including skin tissue sloughed from animals, thereby enabling identifica-tion of animals.

Figure 3:
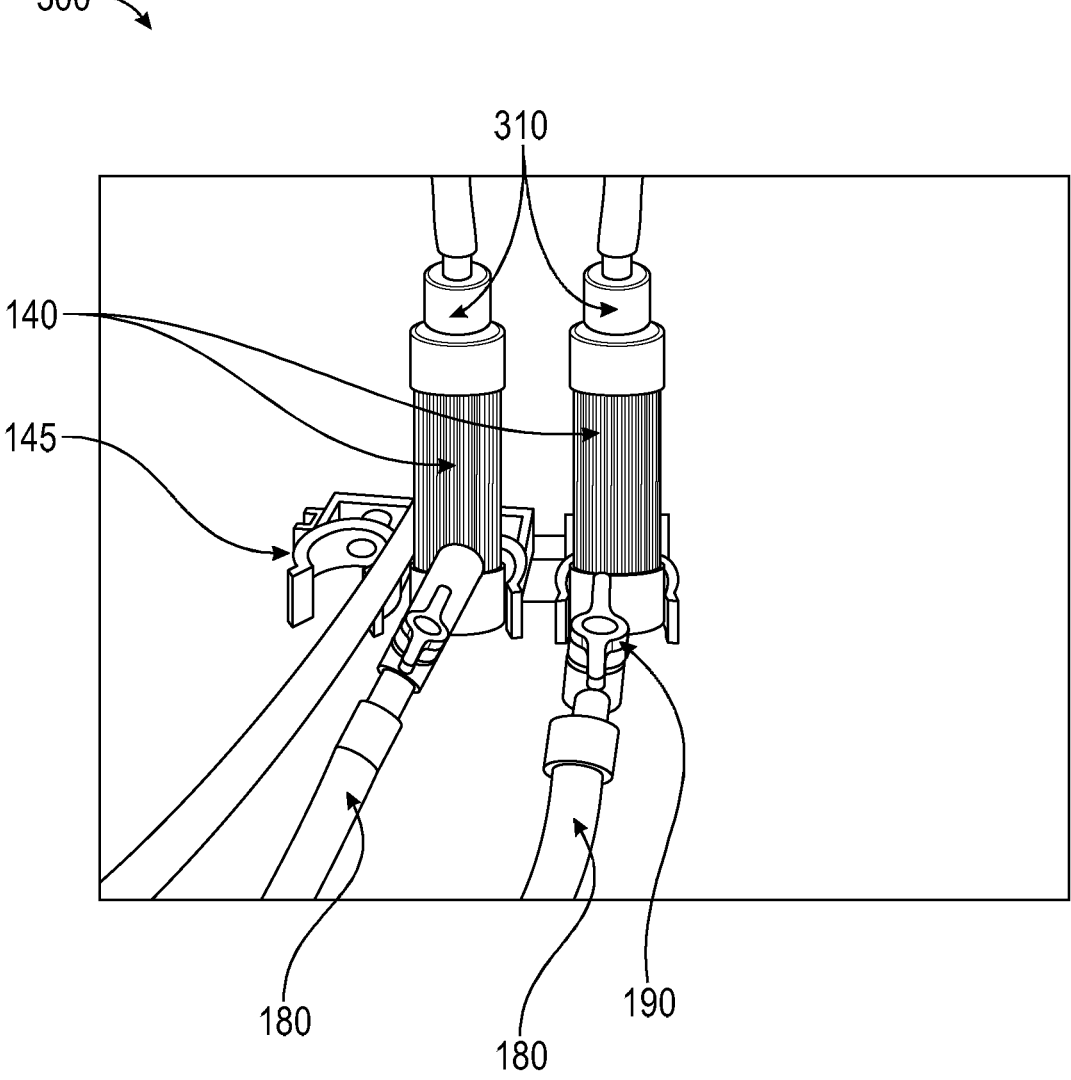
FIG. 3 is a schematic illustration of a filter system used in the exemplary real time environmental DNA sampling device, in accordance with an embodiment of the present invention.

FIG. 3 is a schematic illustration of a filter system used in the exemplary real time environmental DNA sampling device, in accordance with an embodiment of the present invention. FIG. 3 shows a filter system 300 implemented in the present embodiment. The filter system includes two membrane filters 140 placed on respective filter holders 145. Each membrane filter 140 is provided with respective Luer-lock 310 fittings, and each membrane filter 140 includes a unique serial number for identification. For example, with-out limitation, in the present embodiment, hollow membrane filter 140 filters large volumes of water i.e., approximately around 5 L of water in a very short time duration i.e., approximately less than 5 minutes. In some embodiments, filter system 300 may include, for example, without limita-tion, twelve filters 140.

In one embodiment, device 100 may use hollow mem-brane filter 140 in a standalone mode. For example, without limitations, the medium to be filtered may be passively passed through hollow membrane filter 140 without using pump 150 or volume controller 160 as shown in FIG. 1.

Figure 4:
FIG. 4 is a schematic illustration of a filter used in the exemplary real time environmental DNA sampling device, in accordance with an embodiment of the present invention.
Figure 4:
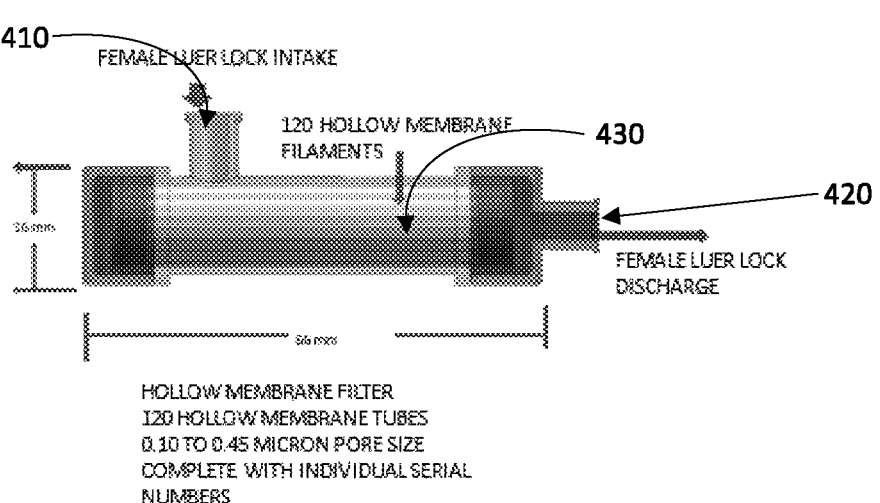

FIG. 4 is a schematic illustration of a filter used in the exemplary real time environmental DNA sampling device, in accordance with an embodiment of the present invention. FIG. 4 shows the dimensions of hollow membrane filter 140 implemented in the present embodiment. Hollow membrane filter 140 includes a first female luer lock connector 410 for receiving input from volume controller 160 of FIG. 2, a second female luer lock connector 420 for engaging with waste lines 170 of FIG. 2, and an enclosure 430 for accom-modating hollow membrane tubes or filaments. For example, without limitation, in the present embodiment, hollow membrane filter 140 has a diameter of 15 mm and a length of 75 mm with a volume capacity of 2.8 ml. Hollow membrane filter 140 includes at least 120 hollow membrane tubes or filaments for filtering. The hollow membrane tubes for example, without limitation, are polyether sulfone (PES) membrane tubes. Each membrane tube provides a filtering surface area of 50 $mm^2$. Therefore, with 120 membrane tubes, filter 140 provides about 6000 $mm^2$ of filtering surface area. Each membrane filament includes a pore with size ranging from 0.1 to 0.45 microns. The size of filter 140 may be increased depending on the amount of fluid that needs to be filtered by increasing the length of the tube and length of membrane tubes (keeping the diameter tube and number of membrane tubes the same. Further, each filter 140 includes individual serial number for identification.

Figure 5:
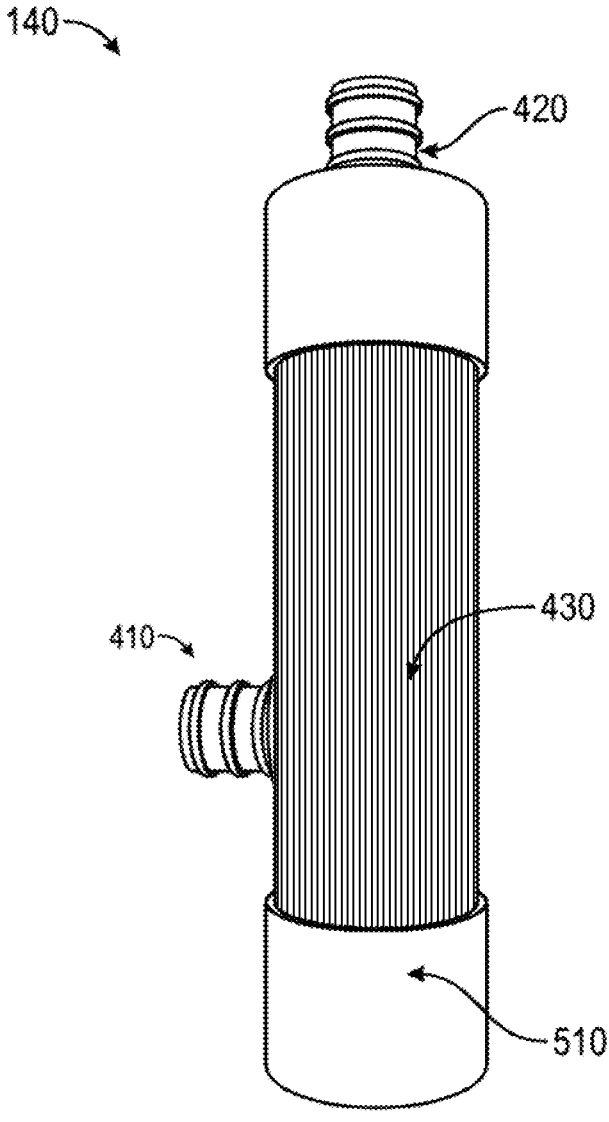
FIG. 5 is an illustration of one aspect of the filter used in the exemplary real time environmental DNA sampling device, in accordance with an embodiment of the present invention.

FIG. 5 is an illustration of one aspect of the filter used in the exemplary real time environmental DNA sampling device, in accordance with an embodiment of the present invention. FIG. 5 illustrates the water drops collected 510 on membrane filaments 430 of filter 140 after completing the filtering process in accordance with the present embodiment.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3rd parties. Applicant(s) also reserves the right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing real time field sampling for DNA extraction according to the present invention will be apparent to those skilled in the art. Various aspects of the invention have been described above by way of illustration, and the specific embodiments disclosed are not intended to limit the invention to the particular forms disclosed. The particular implementation of the real time field sampling for DNA extraction may vary depending upon the particular context or application. By way of example, and not limitation, the real time field sampling for DNA extraction described in the foregoing were principally directed to real time sampling of marine bodies to analyze environmental DNA (eDNA) implementations; however, similar techniques may instead be applied to analyzing eDNA/RNA found in other medium such as, without limitation, air, sewage, freshwater, etc., which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A device comprising:
at least one or more membrane filters, wherein each of said at least one or more membrane filters is operable for collecting one or more samples for extraction of DNA/RNA, each of said at least one or more membrane filters comprises a plurality of hollow membrane tubes or filaments being operable for filtering;
one or more filter holders, said one or more filter holders are configured to engage said at least one or more membrane filters, wherein each of said at least one or more membrane filters having a unique serial number for identification;
at least one intake pump, wherein said at least one intake pump is operable for suctioning and/or transporting said one or more samples to said at least one or more membrane filters for sample collection;
a volume controller, said volume controller is configured to control a flow of said one or more samples being transported to said one or more membrane filters, each having a unique serial number for identification for said sample collection;
wherein said volume controller determines an amount or volume of said one or more samples flowing to said one or more membrane filters;
wherein said volume controller is operable for turning said intake pump off and to turn off the flow of one or more samples, once a preprogrammed level of said one or more samples is reached;
wherein each of said at least one or more membrane filters are preserved for extraction of DNA/RNA;
wherein each of said at least one or more membrane filters further comprises a first female Luer lock connector that is configured to be operable for receiving input from said volume controller;
wherein each of said at least one or more membrane filters further comprises a second female Luer lock connector that is configured to be operable for engaging with one or more waste lines; and
an air pump coupled to an air pump switch, said air pump comprising an air compressor.

2. The device of claim 1, further comprising a controller switch for turning on or off an operation of said volume controller and intake pump.

3. The device of claim 1, further comprising a power source including at least one of, a 12-volt rechargeable lithium-ion battery, and a lithium iron phosphate battery that is configured to be operable for powering an operation of said device, wherein said intake pump engages a suction line.

4. The device of claim 1, wherein said air pump is operable for purging out residual sample upon activating said air pump switch.

5. The device of claim 1, wherein;
said first and second female Luer locks are configured to prevent a contamination of said collected samples for extraction of DNA/RNA; and
said membrane filaments having a pore size ranging from approximately 0.1 to 0.45 microns.

6. The device of claim 1, further comprising one or more water tubes or pipes that are configured to enable the flow and/or transport of one or more samples for extraction of DNA/RNA.

7. The device of claim 1, further comprising a power source including at least one of, a rechargeable battery and a solar battery configured to power an operation of said device.

8. The device of claim 1, further comprising a suction line, wherein said suction line is immersed at a predetermined depth into a sample source or medium for extraction of DNA/RNA.

9. The device of claim 8, wherein the sample comprises liquid or air and the sample source or medium comprises at least one of, an ocean, a sea, a tank, a river, and airborne debris or dust.

10. The device of claim 1, further comprising a priming valve, said priming valve is configured to be operable for allowing said intake pump to prime and to discharge sample waste prior to sampling.

11. The device of claim 10, wherein once said intake pump is primed, said priming valve is closed and the samples flows through said volume controller configured to determine and control the flow of the one or more samples being transported to said one or more membrane filters for sample collection.

12. The device of claim 11, wherein once a preprogrammed volume of sample is pumped into said membrane filters, the flow of one or more samples is automatically turned off and said intake pump turns off.

13. The device of claim 12, further comprising an air pump, said air pump comprises an air compressor, wherein upon turning off said intake pump, said air pump is turned on to purge out residual samples from said one or more membrane filters.

14. The device of claim 13, wherein once residual samples from said one or more membrane filters is purged out, said one or more membrane filters are injected with DNA/RNA stabilizing buffer to preserve the DNA/RNA of the collected samples and minimize the need to freeze the collected samples with liquid nitrogen, and said one or more membrane filters are closed with Luer lock end caps to avoid contamination of the collected samples.

15. The device of claim 1, wherein each of said at least one or more membrane filter further comprises:
an enclosure for accommodating said plurality of hollow membrane tubes or filaments, wherein said enclosure comprises at least 2-12 enclosures; and
wherein said plurality of hollow membrane tubes or filaments comprise at least 120 hollow membrane tubes or filaments.

16. The device of claim 1, further comprising one or more push connect polyethylene valves operable for controlling the flow of one or more samples to at least twelve membrane filters.

17. The device of claim 1, further comprising a programmable micro-processor, said programmable micro-processor is configured to be operable for automatic sample collection, air purging, and injection of DNA/RNA stabilizing buffer.

18. A sampling device consisting of:
one or more sample collecting means for collecting one or more samples for extraction of DNA/RNA, each of said one or more sample collecting means comprises a plurality of hollow membrane tubes or filaments configured to be operable for filtering;
means for engaging said one or more sample collecting means, wherein each of said one or more sample collecting means further comprising a unique serial number for identification;
means for pumping or suctioning the one or more samples to said one or more sample collecting means;
means for controlling a flow of the one or more samples, the one or more samples being transported to said one or more sample collecting means;

means for determining an amount or volume of the one or more samples flowing to said one or more sample collecting means;

means for turning an intake pump off and to turn off the flow of one or more samples, once a preprogrammed level of the one or more samples is reached;

means for preserving the DNA/RNA in the one or more samples;

means for controlling an operation of at least one of said volume determining means and flow controlling means;

means for priming said pumping or suctioning means and discharge waste prior to sampling;

means for purging out residual samples from said one or more sample collection means; and means for avoiding contamination of one or more collected samples.

19. A device comprising:

at least one or more membrane filters, wherein each of said at least one or more membrane filters is configured to be operable for collecting one or more samples for extraction of DNA/RNA, each of said at least one or more membrane filters comprises a plurality of hollow membrane tubes or filaments being operable for filtering;

one or more filter holders, said one or more filter holders are configured to engage said at least one or more membrane filters, wherein each of said at least one or more membrane filters having a unique serial number for identification;

at least one intake pump, wherein said at least one intake pump is operable for suctioning and/or transporting said one or more samples to said at least one or more membrane filters for sample collection;

a volume controller, said volume controller is configured to control a flow of said one or more samples being transported to said one or more membrane filters;

a priming valve, said priming valve is configured to be operable for allowing said intake pump to prime and to discharge sample waste prior to sampling;

wherein said volume controller determines an amount or volume of said one or more samples flowing to said one or more membrane filters;

wherein said volume controller is operable for turning said intake pump off and to turn off the flow of samples, once a preprogrammed level of said one or more samples is reached;

wherein said at least one or more membrane filters are preserved for extraction of DNA/RNA; and an air pump, said air pump comprising an air compressor, wherein said air pump is configured to purge out residual samples from said one or more membrane filters.

20. The device of claim 19, wherein once said intake pump is primed, said priming valve is closed and one or more samples flows through said volume controller, wherein said volume controller is configured to determine and control the flow of said one or more samples being transported to said one or more membrane filters for said sample collection;

wherein once a preprogrammed volume of one or more samples is pumped into said one or more membrane filters, the flow of one or more samples is automatically turned off and said intake pump turns off;

wherein upon turning off said intake pump, said air pump is turned on to purge out residual samples from said one or more membrane filters;

wherein once residual samples from said one or more membrane filters is purged out, said one or more membrane filters are injected with DNA/RNA stabilizing buffer to preserve the DNA/RNA of the collected samples and minimize the need to freeze the collected samples with liquid nitrogen; and wherein once said one or more membrane filters are injected with DNA/RNA stabilizing buffer, said one or more membrane filters are closed with Luer lock end caps to avoid contamination of the collected samples.

* * * * *